United States Patent
Belfiglio

(10) Patent No.: US 6,412,380 B2
(45) Date of Patent: *Jul. 2, 2002

(54) SAW BLADE GUIDE AND COMPONENTS THEREFOR

(76) Inventor: Edward E. Belfiglio, 4112 Foxrun La., Owensboro, KY (US) 42303

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,891

(22) Filed: Nov. 21, 1997

(51) Int. Cl.$^7$ .......................... B27B 13/10; B27B 13/16
(52) U.S. Cl. .............................. 83/168; 83/820; 83/821
(58) Field of Search .................... 83/820, 821, 827, 83/828, 829, 835, 839, 840, 168

(56) References Cited

U.S. PATENT DOCUMENTS

| | | | | |
|---|---|---|---|---|
| 425,105 A | | 4/1890 | McChesney | 83/824 |
| 651,652 A | | 6/1900 | Davis | 83/824 |
| 1,861,412 A | * | 5/1932 | Oliver | 83/168 X |
| 2,375,231 A | * | 5/1945 | Kottmann | 83/168 |
| 2,664,923 A | * | 1/1954 | Ferrari | 83/168 X |
| 2,741,281 A | * | 4/1956 | Braun | 83/168 |
| 2,743,745 A | | 5/1956 | Teague | 83/821 X |
| 2,760,531 A | | 8/1956 | Tommila | 83/821 |
| 2,964,076 A | * | 12/1960 | Debs | 83/168 |
| 3,104,575 A | | 9/1963 | Robinson | 83/168 |
| 3,370,982 A | * | 2/1968 | Hayunga | 83/168 X |
| 3,489,189 A | | 1/1970 | Thrasher | 83/821 |
| 3,534,647 A | * | 10/1970 | Mills | 83/820 |
| 3,557,848 A | * | 1/1971 | Wright | 83/168 X |
| 3,593,763 A | | 7/1971 | Neild | 83/821 X |
| 3,817,142 A | * | 6/1974 | Fingerle et al. | 83/820 |
| 3,848,493 A | * | 11/1974 | Harris | 83/168 |
| 3,961,548 A | * | 6/1976 | Claassen | 83/168 X |
| 3,977,055 A | * | 8/1976 | Gilpatrick | 83/168 X |
| 4,231,274 A | * | 11/1980 | Matchette | 83/820 |
| 4,323,145 A | * | 4/1982 | Allen | 83/821 X |
| 4,466,323 A | * | 8/1984 | Salomonsson | 83/821 |
| 4,474,514 A | * | 10/1984 | Jensen | 83/821 X |
| 4,557,168 A | * | 12/1985 | Tokiwa | 83/820 X |
| 4,563,928 A | | 1/1986 | Salomonsson | 83/821 |
| 4,563,929 A | * | 1/1986 | Ringlee et al. | 83/840 |
| 4,644,833 A | | 2/1987 | Jenkner | 83/99 |
| 4,766,790 A | * | 8/1988 | Harris | 83/820 X |
| 4,920,846 A | | 5/1990 | Duginske et al. | 83/820 |
| 4,972,746 A | * | 11/1990 | Ohnishi et al. | 83/820 |
| 5,070,751 A | * | 12/1991 | Harris | 83/820 X |
| 5,109,744 A | * | 5/1992 | Syre et al. | 83/168 X |
| 5,131,305 A | * | 7/1992 | MacLennan | 83/840 |
| 5,211,092 A | | 5/1993 | Blasi | 83/98 |
| 5,211,212 A | * | 5/1993 | Carlson et al. | 83/839 X |
| 5,303,752 A | * | 4/1994 | MacLennan | 83/840 X |
| 5,410,934 A | | 5/1995 | Krippelz | 83/820 |
| 5,497,684 A | | 3/1996 | Martin | 83/13 |
| 5,680,999 A | * | 10/1997 | Wada | 83/840 X |
| 5,809,859 A | * | 9/1998 | Stroud et al. | 83/829 |

* cited by examiner

*Primary Examiner*—Charles Goodman
(74) *Attorney, Agent, or Firm*—Maurice L. Miller, Jr.

(57) ABSTRACT

An air jet containing blade guide for stabilizing a band saw blade or a circular saw blade of a saw mill and guide blocks or inserts for a saw blade guide are disclosed. The inserts can be removably fastened to a blade guide by means of cap screws preferably containing a hex socket for tightening and loosening the screws with a hex wrench. Cap screw holes formed in the inserts contain recessed countersinks for recessing the heads of the cap screws below a blade opposing surface of the inserts when disposed in an operative position of a blade guide in a saw mill. The inserts can be constructed of brass or aluminum bronze which is softer than the blade being stabilized thereby to avoid undue blade damage but which are hard enough to provide good wearability and heat dissipation as against periodic blade impacts. The blade guide disclosed contains a threaded air inlet port and an air passageway extended between the port and a side of the guide facing a work piece when the guide is operatively positioned in the mill to permit high pressure air supplied to the input port to be directed toward the kerf of the work piece to clean the latter of saw dust.

12 Claims, 4 Drawing Sheets

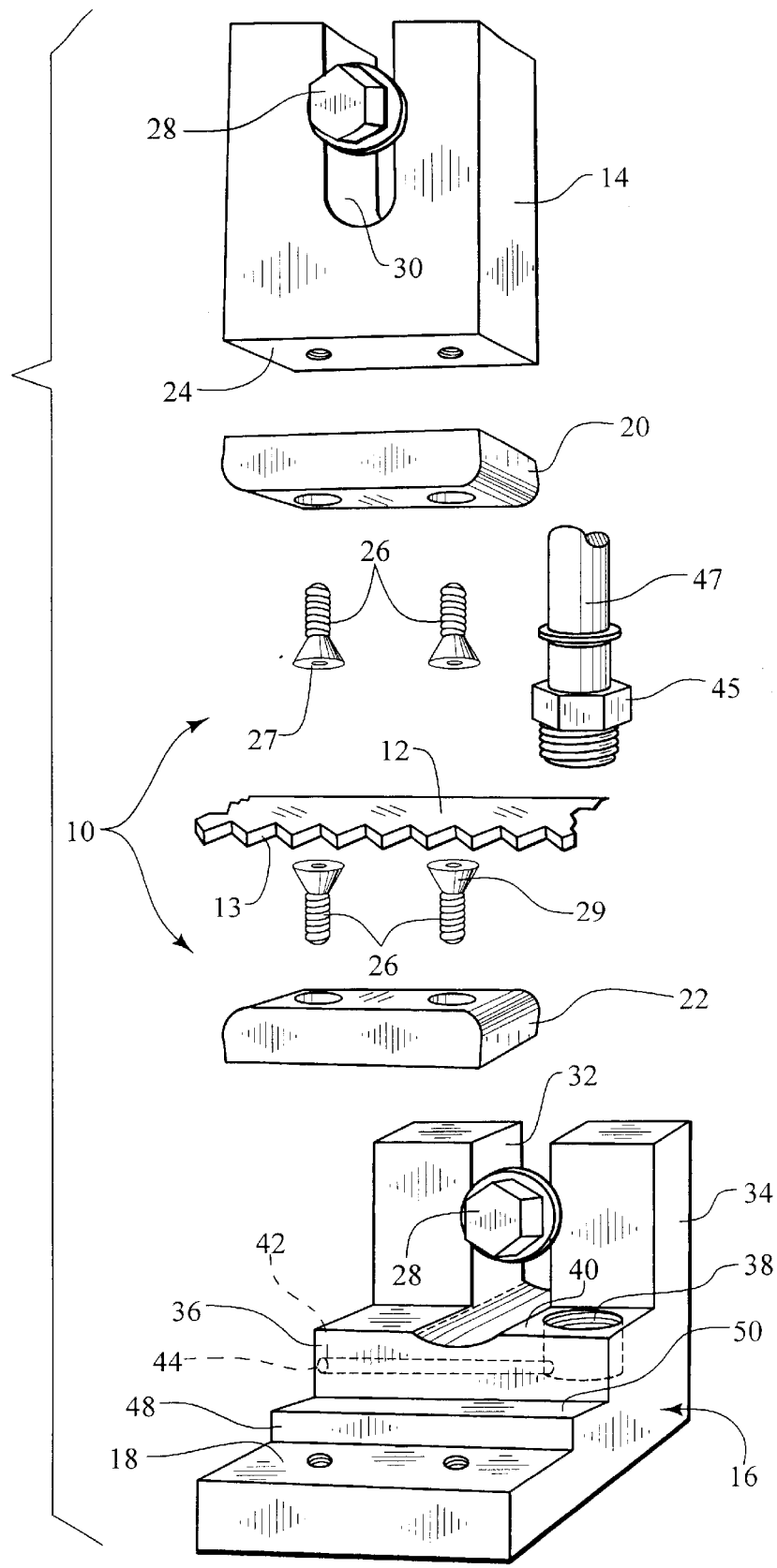
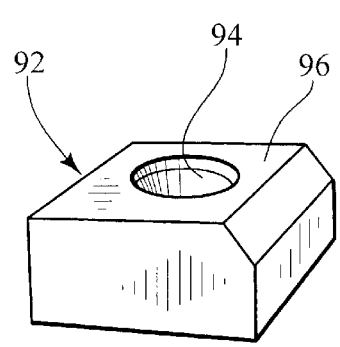
FIG. 1
FIG. 12

SAW BLADE GUIDE AND COMPONENTS THEREFOR

BACKGROUND OF THE INVENTION

This invention relates generally to blade guides and blocks or inserts used on such guides to stabilize a circular saw blade or band saw blade of a saw mill. More specifically, this invention relates to an air jet containing blade guide for use in cleaning the kerf of a work piece and to inserts for saw blade guides.

Broadly speaking, blade guides have long been known and used for stabilizing both band saw and circular saw blades in saw mills. While some early saw blade guides, such as those disclosed in U.S. Pat. No. 425,105 to R. McChesney issued on Apr. 8, 1890, use inserts or blocks which are removably fastened to the saw blade guide by means of threaded fasteners, none of these prior art inserts use cap screws for holding the inserts in place which are countersunk within the insert which are threadably inserted onto and removed from a blade opposing surface of the insert and guide surface upon which the insert is mounted. Moreover, none of the prior art inserts which are mounted on the blade guides are constructed of aluminum brass or aluminum bronze. Further, none of the prior art guides upon which inserts are mounted contain air passageways which open toward the kerf of the work piece being formed in the mill in which the guide and insert is mounted therein.

By means of my invention, these and other difficulties encountered using prior art guides and inserts are substantially eliminated.

SUMMARY OF THE INVENTION

It is an object of my invention to provide a novel metal insert for a blade guide of a saw mill.

It is a further object of my invention to provide a novel metal insert for a blade guide which is removably attachable to the guide.

It is a further object of my invention to provide a novel metal insert for a blade guide which is constructed of aluminum bronze or brass.

It is another object of my invention to provide a novel air jet containing blade guide for either a band or circular saw mill.

Briefly, in accordance with my invention there is provided a metal insert for a saw blade guide for stabilizing a saw blade. The insert comprises a block of material attachable to a saw blade guide. The material is selected from the group consisting essentially of aluminum-copper alloys of bronze and of brass which have a Brinell Hardness Number of between about 110 to 321.

Further, in accordance with my invention, there is provided a blade guide for mounting a blade stabilizing insert thereon. The guide includes a base plate and a block disposed on the base plate and recessed from a free end of the base plate. The block defines an interiorly threaded blind hold forming an air inlet port which opens onto a surface of the block for attachment thereto of an exteriorly threaded air outlet connector of a remote high pressure air source. The block also defines a hollow air passageway extending from the air inlet port to an opening on a side of the block which faces a work piece when the guide is disposed in an operative position in a saw mill. The opening is disposed at about the same level as that of a saw blade being stabilized by the guide when the latter is operatively positioned.

These and other objects, features and advantages of the present invention will become apparent to those skilled in the art from the following detailed description and attached drawings upon which, by way of example, only the preferred embodiments of my invention are illustrated.

BRIEF DESCRIPTION OF THE DRAWINGS

FIG. 1 shows an exploded perspective view of a saw blade guide assembly, thus illustrating a preferred embodiment of my invention.

FIG. 12 shows a perspective view of another alternative form of metal insert that can be used in individually or in multiples in place of each of the inserts as shown in FIGS. 1 and 4.

DESCRIPTION OF THE PREFERRED EMBODIMENT

Figure 2:
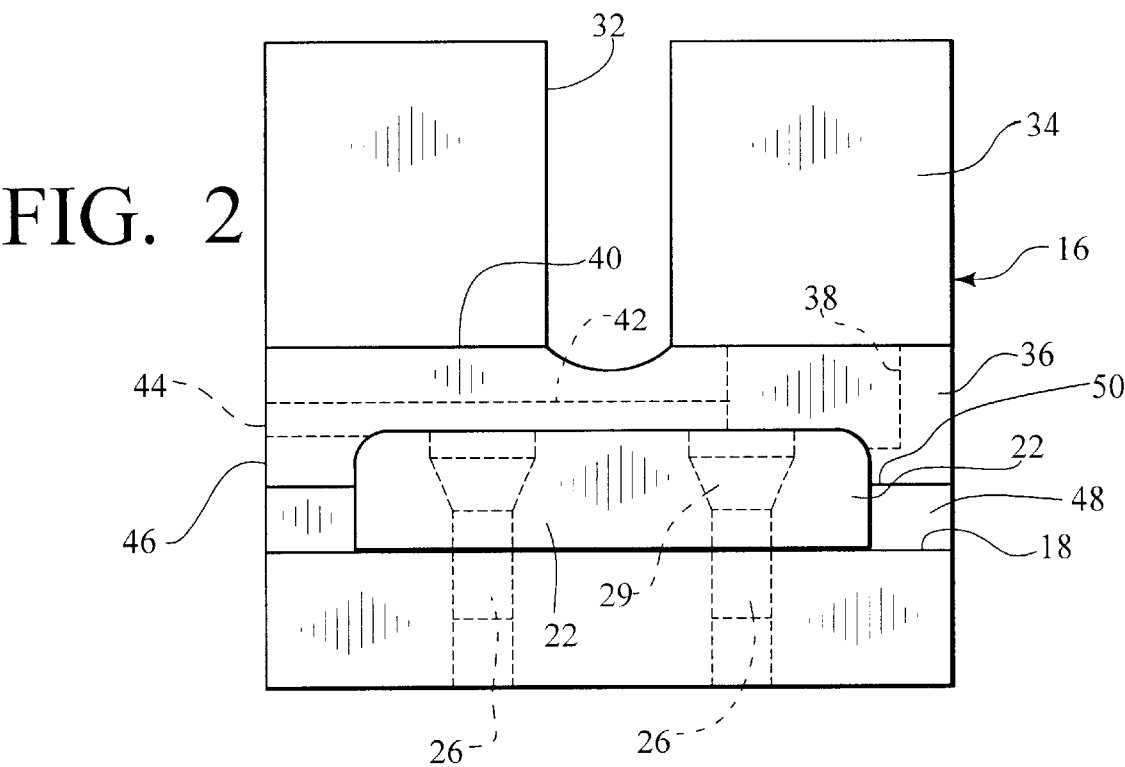
FIGS. 2-3 show a front elevation view and a top plan view, respectively, of a novel angle type blade guide containing a novel metal insert, the guide and insert being components of the assembly of FIG. 1.
Figure 3:
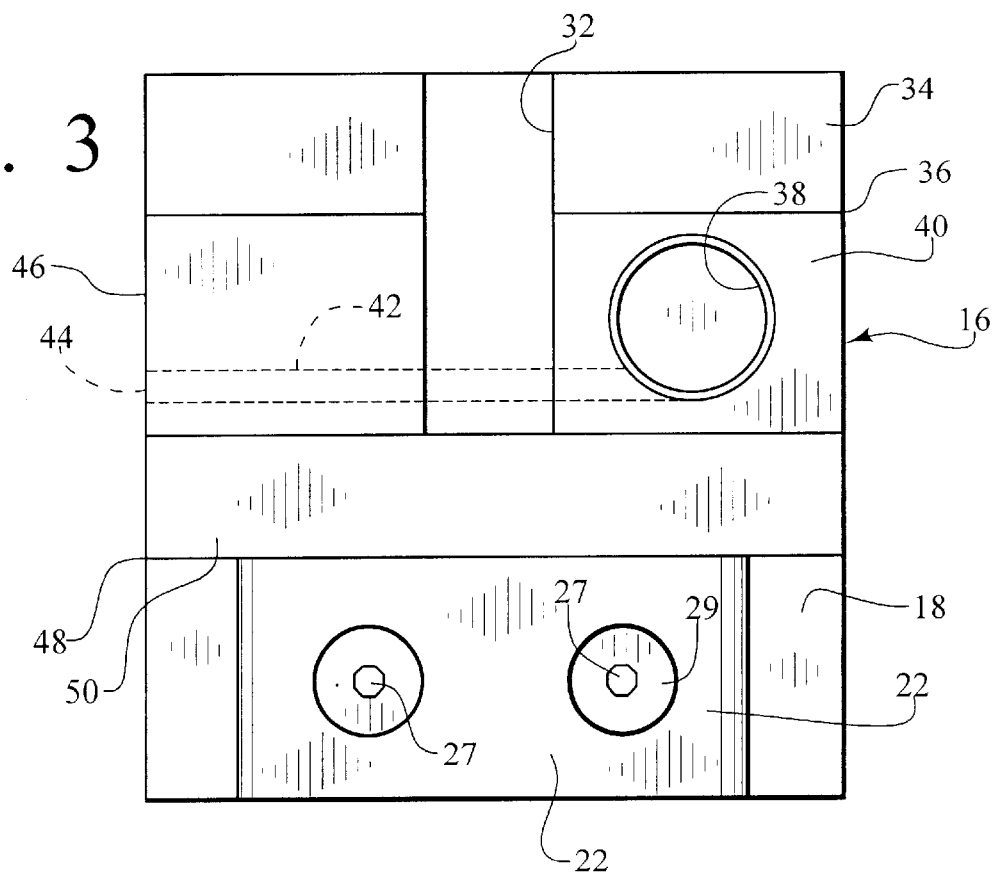
Figure 4:
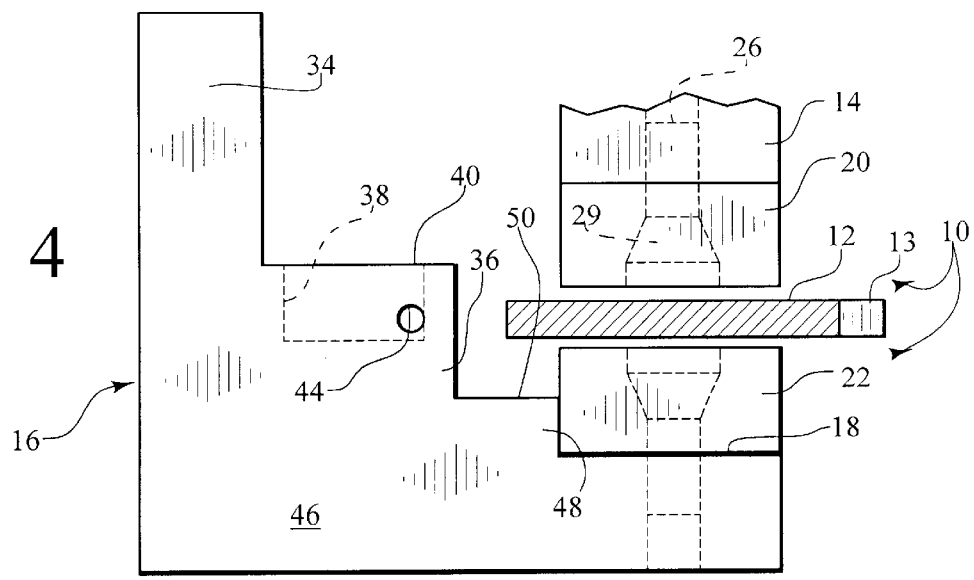
FIG. 4 shows a side elevation view of the angle guide of FIGS. 1-3 together with inserts and fragments of a straight guide and of a band saw blade the same as shown in FIG. 1 except now being in operative positions relative to one another.
Figure 7:
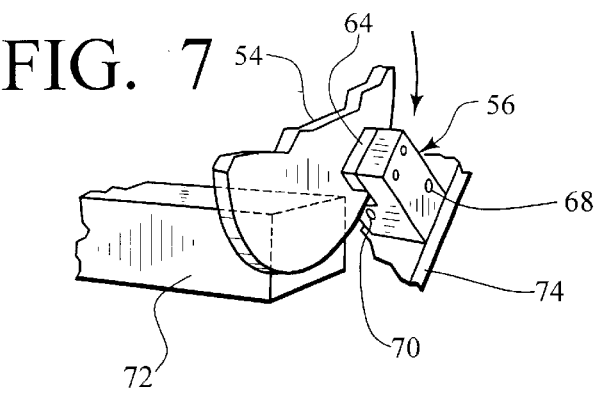
FIG. 7 shows a perspective view of the blade guide of FIGS. 5-6 as used in stabilizing a circular saw blade.

Referring now to the drawing figures and, in particular, to FIGS. 1 and 4 there is shown, in a preferred embodiment of my invention, an improved blade guide assembly, generally designated 10, for stabilizing a band saw blade 12 having cutting teeth 13 of a conventional band saw mill assembly, not shown, to limit or effectively prevent lateral vibration, bending or dishing of the blade during sawing operations. At the outset, it will be understood that the assembly 10 can also be used to stabilize a circular saw blade of a circular saw mill such as is illustrated in FIG. 7 and as later more fully explained. The assembly 10 includes a conventional straight guide 14, located adjacent one broad side of the blade 12 and an improved angle guide, generally designated 16 (See also FIGS. 2-3) having a base plate 18 which is located adjacent the other broad side of the blade. The guides 14 and 16 may be made of any suitable high yield strength material such as, for example, AISI C1018 cold drawn steel or ASTM A-36 hot rolled steel. A novel pair of blade guide blocks or inserts 20, 22 (See also FIGS. 2-3) is removably secured to the blade opposing base plate 18 of the angle guide 16 and to a blade opposing surface 24 (See FIG. 1) of the straight guide 14 by means of threaded fasteners 26. The fasteners 26 are preferably flat head, cap screws, each of which contains a cone shaped head or cap 29 having a hex socket 27 in the cap. The guides 14 and 16 are conventionally attached, adjustably, to the saw mill assembly in the usual, well known manner, as, for example, by means of bolts 28 located in elongated slots 30 and 32 of the guides, 14 and 16, respectively. The slot 32 (FIGS. 1-3) is located in a back plate 34 of the angle guide 16, the base plate 18 and back plate 34 of which adjoin one another to form a generally L-shaped configuration and extend perpendicularly from one another.

The novel feature of the improved angle guide 16 as shown in FIGS. 1-4 comprises an elongated block member 36 which is formed in and along the corner in which the plates 18 and 34 intersect and rises from the base plate along the back plate to a level which is above the level of the blade 12 as it passes between the inserts 20 and 22 when the guide 16 is in its operative position in the saw mill, as best seen in FIG. 4. The block member 36 contains an interiorally threaded blind hole or socket forming an air inlet port 38 located near one side of the block member, which port opens upwardly, as viewed, onto an upper surface 40 thereof. The member 36 also contains a hollow passageway 42 (See FIGS. 1-3) which extends parallel to and is spaced from the back edge of the blade 12 to an opening or air outlet port 44 located on a side 46 (FIGS. 2-4) of the guide 16 which faces a work piece, not shown, when the guide is in its operative position in the mill. When the guide 16 is in its operative position, it is important that the opening 44 be disposed very close to the same level as that of the blade 12 as seen in FIG. 4. The socket 38 can thus be fitted in an air tight manner with a conventional exteriorly threaded connector 45 of an air hose 47 (FIG. 1 only) leading to an externally located high pressure air source such that high pressure air can be directed into the air inlet port 38, thence through the passageway 42 and out of the opening 44 close to and directed alongside the back edge of the blade 12 and against a work piece being operated on by the mill to blow saw dust from the kerf formed by the blade 12.

Preferably, the block 36 forms a second step in conjunction with a first step 48 (See FIGS. 1-4), the first step being recessed sufficiently from an outer edge of the base plate 18 to provide sufficient space on which to mount the insert 22 on the base plate. The raised first step 48 thus forms a backing wall for the insert 22 but allows the blade 12 to overlie an upper surface 50 thereof when the angle guide 16 is in its operative position in the mill. Preferably, the block or step 36, step 48, base plate 18 and back plate 34 are integrally formed as a single unitary angle blade guide component.

The blade guide assembly 10 of FIGS. 1 and 4 can also be used to stabilize a conventional circular saw blade as well as a band saw blade such as the blade 12. Moreover, the air inlet port 38 and passageway 42 with opening 44 can also be used to clean the kerf of a work piece being operated on by such a circular saw blade. To use the assembly 10 with a circular saw, the angle guide 16 should be arranged so that the vertical side 46 of the guide 16, as viewed, faces a peripheral portion of the teeth of the circular saw blade as they enter the work piece. Assuming the blade 12 of FIG. 4 is an outer peripheral wedge portion of a circular saw blade, the cutting teeth 13 of the blade would then be on the left edge of the blade 12, as viewed, opposing but spaced from the block 36, rather than being on the right edge as in the band saw of the example previously discussed. Further, the blade guide assembly 10, including the straight guide 14 with its insert 20 and the opposing angle guide 16 with its insert 22, should be disposed in the circular saw mill at an angle of from about 15 to 25 degrees from the work piece as measured in a plane containing the saw blade such that, as the circular saw rotates, a given tooth of the blade will rotate through the assembly 10 about 15 to 25 degrees of arc before it rotates into a cutting position against the work piece.

Figures 5, 6:
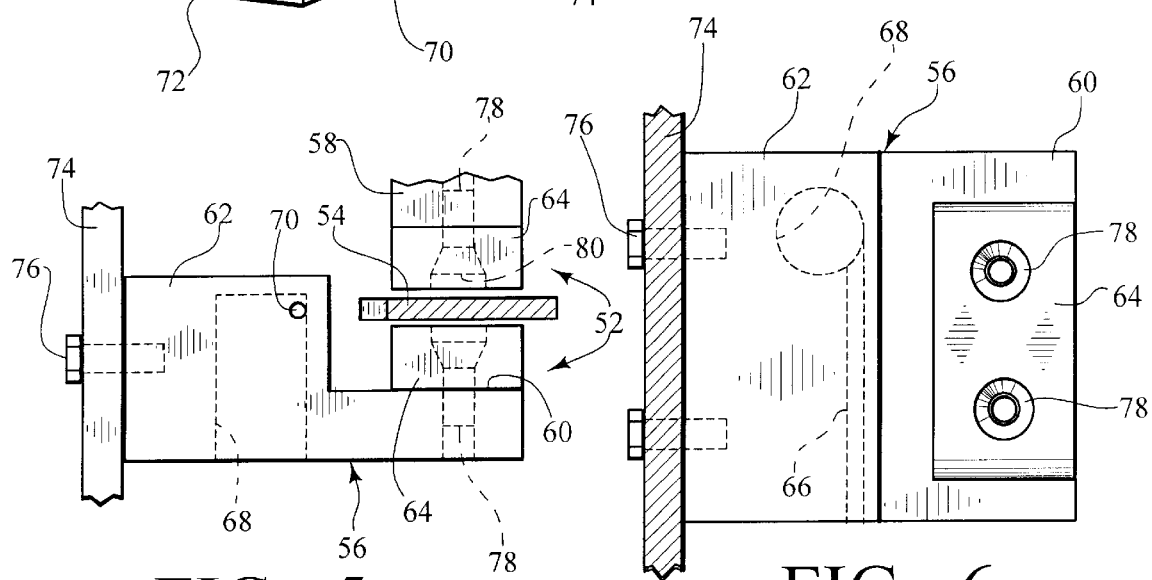
FIGS. 5-6 show a side elevation view and a top plan view, respectively, of a novel saw blade guide which is an alternative to the angle guide of FIGS. 1-4, thus illustrating another important embodiment of my invention.

Referring now to FIGS. 5-7, there is shown, in another important embodiment of my invention, a saw blade guide assembly, generally designated 52, which, as in the case of the assembly 10 of the previous example, can also be used to stabilize the blade of either a band or a circular saw. In the present example, the assembly 52 is shown in use with a circular saw blade 54, a fragment of which is shown, schematically, in FIG. 5 with saw teeth assumed on and around an outer peripheral portion thereof. The assembly 52 includes an air jet saw blade guide, generally designated 56, and a straight guide 58 (FIG. 5 only), which may be similar to the straight guide 14 of the previous example. The guide 56 can also be used in place of the angle guide 16 of FIGS. 1-4 and includes a base plate 60 containing a block 62 thereon. The block 62 is recessed sufficiently from an outer free edge of the base plate 60 to permit an insert 64 to be removably mounted thereon. A similar insert 64 (FIG. 5 only) is removably attached to the straight guide 58. The block 62 extends above the base plate 60 to a level which is above the blade 54 as best seen in FIG. 5 to permit placement through the block of a hollow air passageway 66 (See FIG. 6) between an interiorly threaded blind hole, which functions as a high pressure air inlet port 68, and an opening 70 on a side of the block 62. The opening 70 functions as an air outlet port so as to expel high pressure air toward a work piece 72 (See FIG. 7) being operated upon by the saw blade 54. The expelled air steam should be aligned so as to be directed tangent to the periphery of the blade teeth 54 entering the work piece. In this manner, the guide 56 operates to aid in stabilizing the blade 54 and also to provide a high pressure air steam to clean the kerf in the work piece 72 formed by the blade. The block 62 should be formed so as to be sufficiently thick to permit the back of the guide 56 to be securely attached to a conventional bolster 74 on the saw mill containing the blade 54 as by means of suitable threaded members 76. The inserts 64 may be of any suitable type but are preferably of the same type as those shown at 20 and 22 of the previous example. As in the previous example, the inserts 64 are preferably removably secured to the base plate 60 by means of suitable flat head, socket head, cap screws 78. As in the previous example, it is important that the surface of the head 80 (See FIG. 5) of each of the screws 78 be disposed in a countersink in an upper surface portion of the inserts 64 so as to be recessed and spaced below the blade opposing surface of the insert.

Figure 8:
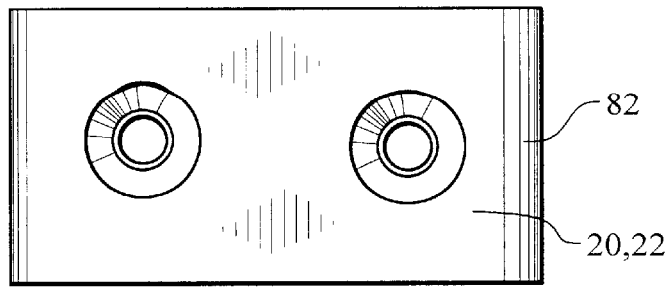
FIGS. 8-9 show a plan view and a longitudinal elevation view, respectively, of one of the novel metal inserts of FIGS. 1-4.
Figure 9:
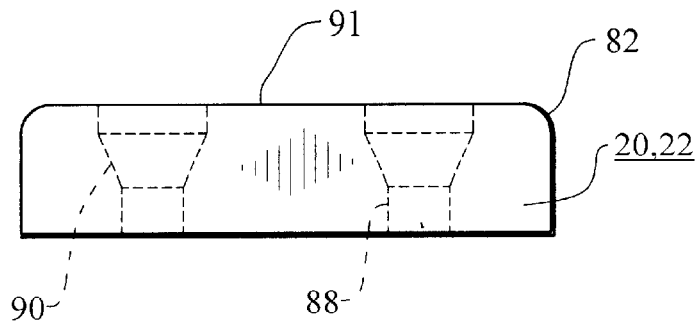
Figure 10:
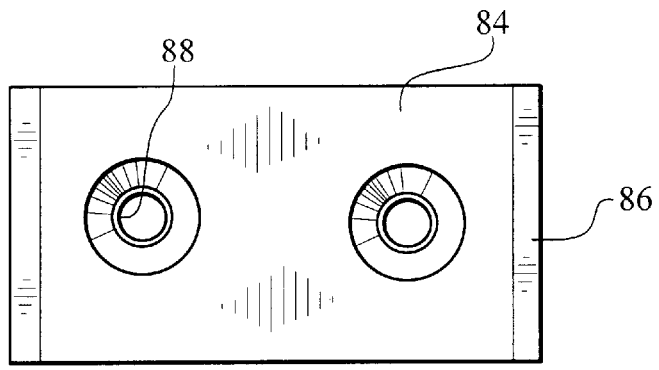
FIGS. 10-11 show a plan view and a longitudinal elevation view, respectively, of an alternative form of metal insert that can be used in place of each of the inserts shown in FIGS. 1-4 and 8-9.
Figure 11:
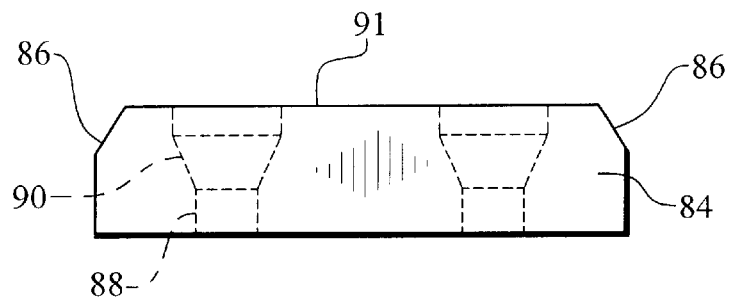

Referring now also to FIGS. 8-9 the novel inserts 20, 22 of the assembly 10 of FIG. 14 are shown in detail. These inserts 20, 22 are also of the same type shown in the example of FIGS. 5-7 as at 64. They are constructed of copper aluminum alloy (bronze or brass). They must have sufficient abrasion resistance, heat dissipation capability and wearability to be of practical use as inserts for band saw and circular saw guides in that they will also have a reasonable service life. However, they must not be so hard that they will damage a rapidly moving blade being stabilized thereby when impacted by the blade, as will occur periodically during normal use. When using a continuous cast aluminum bronze insert, I have found that such a material classified by Specification ASTM B-505, Grades 952-959 will meet these requirements. Similarly, when using an individually cast aluminum bronze insert, I have found that such a material classified as ASTM B-148, Grades 952-959 will also meet these requirements. The Brinell Hardness Number of such aluminum bronze or brass inserts, as measured under a 3,000 kg load, should be within the range of about 110 to 321. For a BHN of less than about 110, I find that the insert lacks sufficient wearability for practical use and for a BHN above about 321 the insert will ordinarily be harder than the blade being stabilized wherein blade damage can be expected upon impact with the insert. The insert of FIGS. 8-9, as also shown in the assembly 10 of FIGS. 1-4 and, of which are the same type as used in the assembly 52 of FIG. 5, have rounded edges 82 on opposite ends of blade opposing surface portions thereof, which ends extend transversely relative to movement of the band saw blade 12 of FIGS. 1 and 4). In the alternative, FIGS. 10-11 show the same type of aluminum bronze or brass insert 84 as those at 20, 22 of FIGS. 8-9 except that this insert contains a pair of beveled edges 86 on opposite ends of a blade opposing surface portion. Here, again, the beveled edges 86 extend transversely with respect to the direction of band saw blade movement. In each of the inserts 22 and 84 of FIGS. 8-9 and 84 of FIGS. 10-11, respectively, two untapped screw holes 88 are formed in a base portion thereof with a recessed frustroconical countersunk portion 90 formed above the screw hole 88, as viewed, so that a cap screw, such as is shown at 26 in FIGS. 1 and 4, can be inserted therein to a level below an upper surface 91 of the insert. I recommend that the cap screws 26, as shown in the example of FIGS. 1-4 and as shown at 78 in the example of FIGS. 5-6, be preferably of the hex socket type for use of a standard hex wrench to secure and loosen the same from its corresponding guide, although other types of commonly known cap screws could be employed wherein a standard tool such as a screw driver could be used to secure and remove the same from its guide.

Referring now to FIG. 12, there is shown a blade guide insert, generally designated 92, which may be made of tungsten carbide, which is the material from which conventional saw blade guide inserts are commonly made. However, conventional tungsten carbide inserts are permanently attached to blade guides by means of silver soldering, brazing or other fusion processes. In this example, I form a recessed countersunk cap screw hole 94 through the insert 92 so that it may be secured in place on its saw blade guide by cap screws, preferably of the same type as shown at 26 in FIGS. 1 and 4 and at 78 in FIGS. 5-6 and as explained in the previous examples. Here, as in the previous examples, the cap screw hole 94 should be formed so that the countersink is recessed below the level of the blade opposing surface 96 of the insert 92 so that the head of the cap screw will not be impacted by the saw blade when the latter impacts the surface 96 of the relatively softer tungsten carbide material.

Although the present invention has been illustrated and described herein with respect to certain preferred embodiments, it is not intended that this patent should be limited in scope and coverage by such details other than as specifically set forth in the following claims.

I claim:

1. An improved angle guide for a band saw blade guid assembly of a saw mill which conventionally includes a base plate for attachment of saw stabilizing metal insert thereto and a backing plate adjoining one end of said base plate and extending at a right angle from said base plate for attachment to the saw mill, the improvement of which comprises a block member disposed in a corner between said plates extending along said corner parallel to, opposing and spaced from a back edge of a band saw blad of the mill when said angle guide is disposed in an operative position, said block member defining an anir inlet port opening onto a surface thereof for attachment to a source of high pressure air, said block member also defining a hollow passageway extending from communication with said inlet port to an opening on a side of said block member expelling high pressure air along the back edge of the band saw blade in a direction of a work piece to be cut by the band saw blade when said angle guide is operatively positioned in the mill.

2. The angle guide of claim 1 wherein said blcok member forms two steps, a first lower step extending upwardly from said base plate adjacent to a position of the metal insert when said insert is attached to said base plate, a second upper step being recessed from said first step and extending above a level of the band saw blade when said guide is operatively positioned, said air inlet port and said hollow passageway being formed in said second upper step.

3. The angle guide of claim 1 wherein said air inlet port is located near one side of said block member which is opposite the side of said block member upon which said passageway opens.

4. The angle guide of claim 1 wherein said air inlet port opens upon an upper surface of said block member which faces a direction which is perpendicular to the opening containing side of said block member.

5. The angle guide of claim 1 wherein said air inlet port is interiorally threaded to receive an exteriorally threaded air outlet connector of an air hose from an external source of high pressure air.

6. The angle guide of claim 1 further comprising a band saw stabilizing metal insert attached to said base plate adjacent to said block member, said insert comprising a block of material selected from the group consisting essentially of aluminum bronze and aluminum brass.

7. The angle guide of claim 6 wherein said block member is generally rectangularly shaped and includes rounded edges on opposite ends thereof which are position on said base member so as to extend transversely with respect to the saw blade to be stabilized when said angle guide is disposed in operative position in said mill.

8. The angle guide of claim 6 wherein said block member is generally rectangularly shaped and includes beveled edges on opposite ends thereof which are positioned on said angle guide so as to extend transversely with respect to the saw blade to be stabilized when said angle guide is disposed in operative position in said mill.

9. The angle guide to claim 6 wherein said metal insert is removably attached to said base plate.

10. The angle guide of claim 9 wherein said metal insert defines at least one recessed countersunk hole therethrough for insertion of a cap screw therein in close conforming relation in said hole below the level of a cap saw blade opposable surface of said insert for removable attachement of said insert to said base plate.

11. The angle guide of claim 10 further comprising at least one cap screw for insertion into said countersunk hole in close conforming relation such that a cap of said screw is below the saw blade opposable surface of said insert when said angle guide and insert a re operatively positioned in said mill.

12. The angle guide of claim 11 at least one cap screw includes a flat head cap screw defining a hex socket for insertion therein of a hex wrench for securing and removing said insert to and from said base plate.

* * * * *